US009224301B2

(12) United States Patent
Pakki et al.

(10) Patent No.: US 9,224,301 B2
(45) Date of Patent: Dec. 29, 2015

(54) SYSTEM AND METHOD FOR PROVIDING ADVISORY SUPPORT INFORMATION ON DOWNLINK CLEARANCE AND REPORTS

(71) Applicant: Honeywell International Inc., Morristown, NJ (US)

(72) Inventors: Sathish Pakki, Bangalore (IN); Karthik Rao, Bangalore (IN); Showvik Chakraborty, Karnataka (IN); Chandrasekhar TLV, Bangalore (IN); Ganesh Kondeti, Bangalore (IN); Chinmaey Sharad Shende, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 201 days.

(21) Appl. No.: 13/891,711

(22) Filed: May 10, 2013

(65) Prior Publication Data

US 2014/0336915 A1 Nov. 13, 2014

(51) Int. Cl.
*G06F 19/00* (2011.01)
*G08G 5/00* (2006.01)

(52) U.S. Cl.
CPC ............ *G08G 5/0013* (2013.01); *G08G 5/0021* (2013.01); *G08G 5/0039* (2013.01)

(58) Field of Classification Search
None
See application file for complete search history.

(56) References Cited

U.S. PATENT DOCUMENTS

| | | | | |
|---|---|---|---|---|
| 7,979,199 | B2 | 7/2011 | Judd et al. | |
| 8,229,659 | B2 | 7/2012 | Judd et al. | |
| 2008/0086290 | A1* | 4/2008 | Wilson | 703/6 |
| 2008/0163093 | A1 | 7/2008 | Lorido | |
| 2010/0332054 | A1* | 12/2010 | Brandao et al. | 701/3 |
| 2012/0078445 | A1* | 3/2012 | Krupansky et al. | 701/3 |
| 2012/0095623 | A1 | 4/2012 | Barral et al. | |
| 2013/0297102 | A1* | 11/2013 | Hughes et al. | 701/3 |
| 2014/0039734 | A1* | 2/2014 | Ramaiah et al. | 701/14 |

FOREIGN PATENT DOCUMENTS

| | | |
|---|---|---|
| EP | 1318492 | 6/2003 |
| EP | 1947624 | 7/2008 |
| EP | 2267683 | 12/2010 |

OTHER PUBLICATIONS

Jackson, M. et al., "Airborne Technology for Distributed Air Traffic Management", "IEEE Conference on Decision and Control", Dec. 12, 2005, pp. 3947-3954, Publisher: IEEE.

Wing et al., "Airborne Use of Traffic Intent Information in a Distributed Air-Ground Traffic Management Concept: Experiment Design and", "4th USA/Europe Air Traffic Management R&D Seminar", Dec. 3, 2001, pp. 1-11.

European Patent Office, "Office Action for EP Serial No. 14165706.4", "for Foreign Counterpart of U.S. Appl. No. 13/891,711", Nov. 18, 2014, pp. 1-8, Published in: EP.

European Patent Office, "European Search Report for Application Serial No. 14165706.4", "for Foreign Counterpart of U.S. Appl. No. 13/891,711", Oct. 31, 2014, pp. 1-3, Published in: EP.

* cited by examiner

*Primary Examiner* — Adam Alharbi
(74) *Attorney, Agent, or Firm* — Fogg & Powers LLC

(57) ABSTRACT

A method for requesting air traffic control (ATC) clearance comprising receiving user input to display an ATC clearance request page corresponding to a respective flight parameter; based on the received user input, requesting a computed value for the respective flight parameter from a flight management (FMS) system; and displaying the computed value with the ATC clearance request page corresponding to the respective flight parameter.

17 Claims, 4 Drawing Sheets

SYSTEM AND METHOD FOR PROVIDING ADVISORY SUPPORT INFORMATION ON DOWNLINK CLEARANCE AND REPORTS

BACKGROUND

In the course of a flight, situations arise where the pilot must request clearances or deviations in the flight plan due to weather, aircraft performance, or fuel constraint through Controller Pilot Data Link Communications (CPDLC). A flight plan generally includes basic information such as, but not limited to, departure and arrival points, estimated time en route, alternate airports, number of people on board, endurance and information about the aircraft itself. In general, different types of requests will be made to Air Traffic Control (ATC) through a CPDLC data link for clearances or deviations. These can include vertical clearances, crossing constraints, route deviation, and speed changes.

While performing CPDLC downlink requests, due to pilot resource limitations, the pilot is not always aware of the optimal deviation for the flight plan course and must depend on the Flight Management System (FMS). To do this, the pilot manually looks into the FMS and enters the FMS computed data manually in Communication Management Unit (CMU) pages or Communication Management Function (CMF) pages for ATC downlink requests and reports.

SUMMARY

In one embodiment, a method for requesting air traffic control (ATC) clearance is provided. The method comprises receiving a user input to display an ATC clearance request page corresponding to a respective flight parameter. Based on the received user input, a request is made for a computed value for the respective flight parameter from a flight management system (FMS). The computed value is displayed with the ATC clearance request page corresponding to the respective flight parameter.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
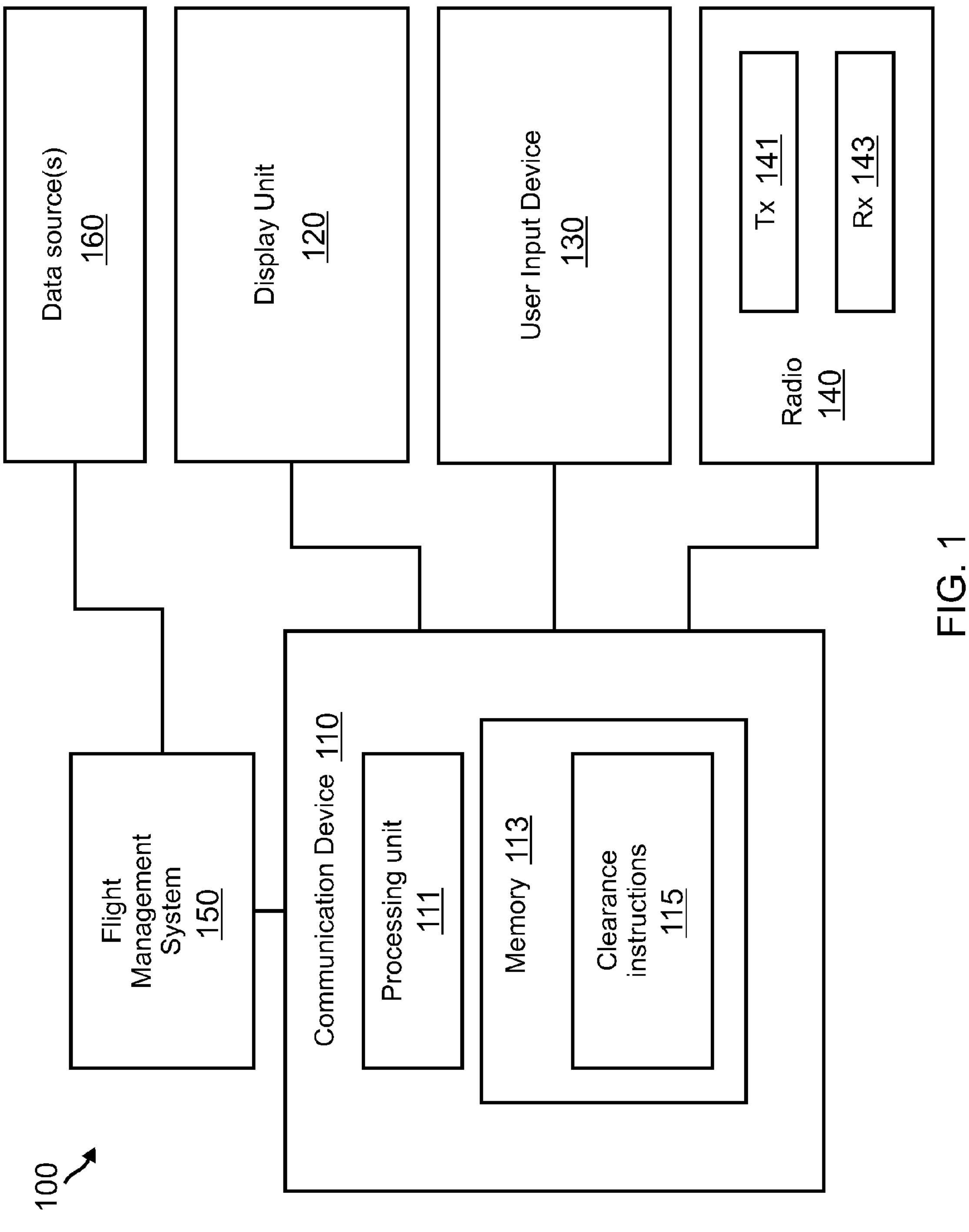
FIG. 1 is block diagram of one embodiment of an exemplary avionic system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of one embodiment of an exemplary avionic system 100. System 100 includes one or more communication devices 110, such as a datalink communication device. The communication device 110 can include, but is not limited to, a communication management unit (CMU) or communication management function (CMF). The communication device 110 is configured to send and receive messages, such as Controller Pilot Data Link Communications (CPDLC) messages, via a radio 140. The radio 140 includes a transmitter 141 configured to transmit signals and a receiver 142 configured to receive signals as known to one of skill in the art.

The communication device 110 is coupled to a display unit 120 on which messages, such as the system generated messages and ATC clearance request pages, are displayed. In one embodiment, the display unit 120 can graphically represent messages, advisory support information, deviation request pages, and downlink reports. In other embodiments, the display unit 120 is a textual-based display. The display unit 120 can be implemented as any display unit which is capable of displaying textual and/or graphical content. Suitable exemplary display units include, but are not limited to, a display associated with the FMS, a multifunction display (MFD), a Multifunction Control and Display Unit (MCDU), or a display associated with a CMU. Suitable technologies for implementing the display unit 120 include, but are not limited to, a cathode ray tube (CRT) display, an active matrix liquid crystal display (LCD), a passive matrix LCD, or plasma display unit.

Communication device 110 is also coupled to user input device 130. The user input device 130 can be implemented as, but is not limited to, keyboards, touch screens, microphones, cursor control devices, and line select buttons. It is to be understood that the display unit 120 and user input device 130 can be implemented in the same device or in separate devices.

Communication device 110 is also coupled to an onboard avionics system 150. In one embodiment, the onboard avionics system is a flight management system (FMS) 150. In some embodiments, the FMS 150 is a flight management computer (FMC) or flight management function (FMF). The FMS 150 is coupled to various data sources 160, such as the data sources discussed above. In some embodiments, the data sources are line replaceable units (LRUs). The FMS 150 is configured to obtain data relevant to a flight plan from the data sources 160, such as current position, weather, remaining fuel, current flight weight, and flight plan. When the pilot or flight crew needs to request a change to a flight parameter (such as, but not limited to, altitude, speed clearance, or route deviation) the FMS 150 uses the various data from the data sources 160 to propose suggested deviation values to the pilot, as discussed above. In other embodiments, onboard avionics systems other may be coupled to the communication device 110. These devices include, but are not limited to, a traffic collision avoidance system (TCAS), automatic dependent surveillance-broadcast system (ADS-B) such as a cockpit display of traffic information (CDTI) in trail procedures (ITP) system, a radar system such as weather radar, or other onboard avionics system. Any combination of these devices may be used. In yet other embodiments, the above mentioned devices comprise data sources 160 for the FMS 150. The onboard avionics systems 150 are configured to obtain data relevant to a flight plan and propose suggested changes to the flight plan.

The FMS 150 is further configured to identify changes in one or more flight parameters of a flight plan and sends an indication of this proposed change to the communication device 110 via an advisory as discussed above. For example, when the current flight plan is different from the proposed changes, the FMS 150 is configured to identify changes that need to be made and communicated to the ATC, and to send the data to the communication device 110 as an advisory. In addition, in some embodiments, the FMS 150 is configured to determine if the difference between the proposed changes and the current flight plan exceed a pre-defined threshold value. If the difference does not exceed the threshold, then the FMS 150 does not send an advisory to the communication device 110. In this way, the workload or burden placed on the flight crew is reduced by not requiring them to review minimal changes. In one embodiment, the threshold value is a value that is defined as a configurable system object, such as a database or any non-volatile storage which is accessible by the flight management system or other avionics system.

Communication device 110 includes a processing unit 111 and a memory 113. The processing unit 111 includes or functions with software programs, firmware or other computer readable instructions for carrying out the various methods, process tasks, calculations, and control functions, discussed with respect to FIGS. 1-3 in providing advisory support information on downlink clearance and reports. In some embodiments, the FMS 150 can be configured to provide the functionality of communication device 110 also.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

For example, in the embodiment shown in FIG. 1, clearance instructions 115 are stored on memory 113 and executed by the processing unit 111. In particular, when executed, clearance instructions 115 cause the processing unit 111, which includes at least one programmable processor, to perform the acts and functions discussed above. For example, the communication device 110 generates system messages, requests computed values from the FMS, updates system generated messages, etc., as discussed above. In other embodiments, communication device 110 is operable to enable or disable all or certain features of automatically generating system messages based on Airline Modifiable Information, a separate loadable database or profile, and Aircraft Personality Module, or settings stored in non-volatile memory that is portable or integrated into the communication device 110.

Figure 2:
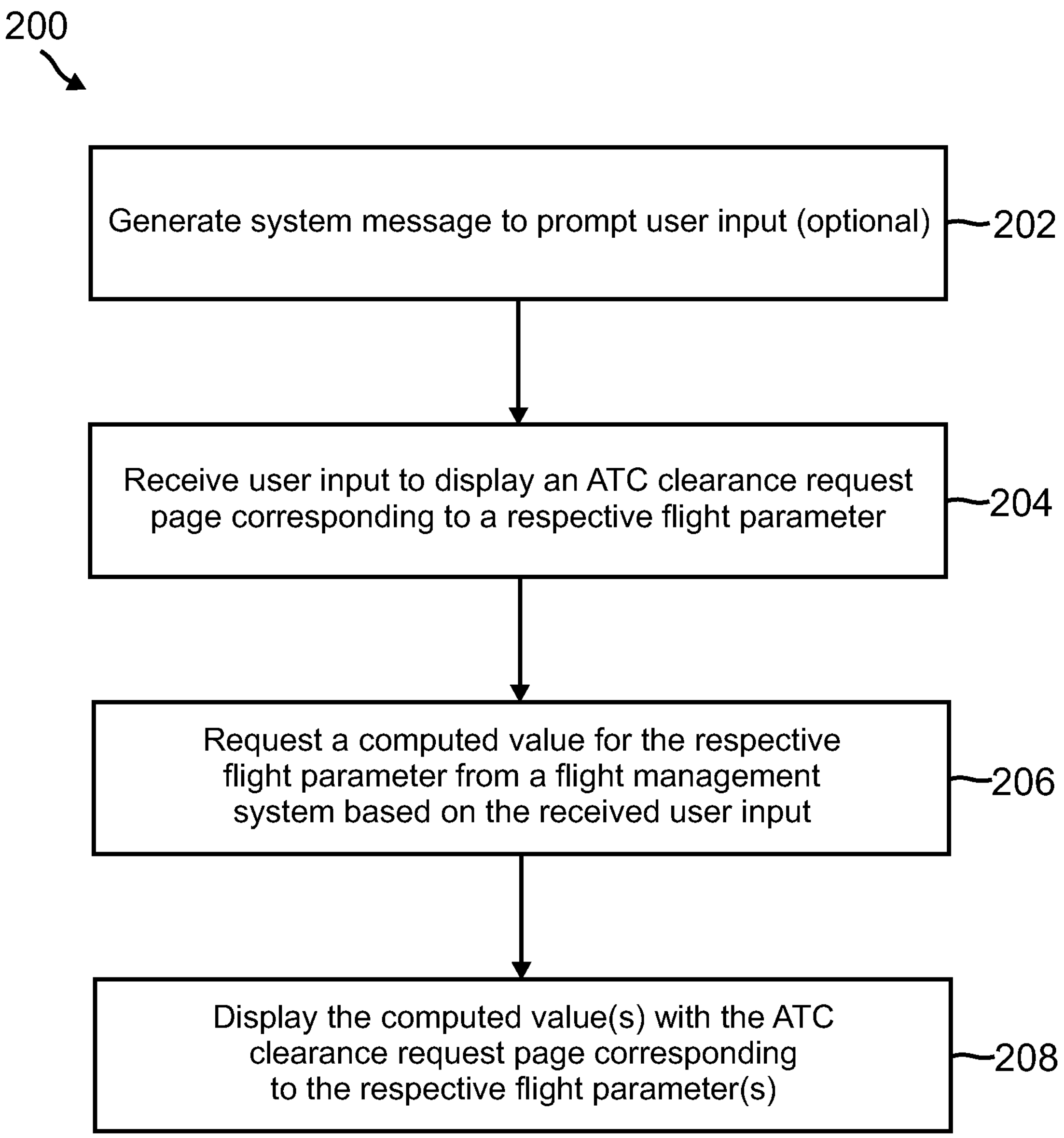
FIG. 2 is a flow chart depicting one embodiment of an exemplary method for providing advisory support information to a pilot on downlink clearances and reports.

FIG. 2 is a flow chart of one embodiment of a method 200 for providing advisory support information on downlink clearance and reports. As used herein, the term "advisory support information" refers to information used by a pilot or flight crew in requesting clearance from an air traffic control (ATC). In particular, advisory support information includes flight parameters, such as, but not limited to, altitude, speed, route, expected time, etc. Hence, as used herein, a flight parameter is a parameter of an aircraft. In addition, as used herein, the term 'downlink' refers to messages that are transmitted from the aircraft to the ATC on the ground. Similarly, the term "uplink", as used herein, refers to messages that are transmitted from the ATC on the ground to the aircraft. In addition, the term 'sidelink' refers to messages generated by a system on the aircraft and delivered to another component or device on the aircraft. Hence, sidelink messages are also referred to herein as 'system generated messages,' 'advisory messages' or 'system messages'. Additionally, the term 'ATC clearance request' refers to a downlink message requesting permission or clearance from an ATC to take the requested action. Hence, the terms 'ATC clearance request' and 'downlink clearance' are used interchangeably herein. Furthermore, a 'page' or 'screen' refers to a display on a display unit associated with a given message. For example, an ATC clearance request page refers to a display on the display unit which displays the information associated with a given ATC clearance request. Similarly, a system generated message page refers to the display of a system generated message on the display unit. In addition, as used herein, a 'user' refers to a pilot or other member of a flight crew.

Method 200 begins at block 202 where a system message is generated to prompt a user for input. In particular, the system generated message prompts a user (e.g. pilot or flight crew member) to provide input instructing the system to display an ATC clearance request page corresponding to a respective flight parameter. For example, the system generated message can prompt a user to instruct the system to display an ATC clearance request page for requesting clearance to change the speed, altitude, route, etc. of the aircraft. An exemplary method of generating a system message is discussed in more detail below with respect to FIG. 4.

Once the user input is received, at block 204, instructing the system to display an ATC clearance request page, method 200 continues at block 206. It is to be understood that generation of the system message at block 102 is optional. For example, in some instances, the user can instruct the system to display an ATC clearance request page without the prompt from the system generated message. That is, the user may determine a desire to request clearance for a change in a flight parameter without a prompt from the system.

At block 206, a computed value for the respective flight parameter is requested from a flight management system (FMS) or other onboard avionics system. As known to one of skill in the art, the FMS is a system that performs in-flight management of a flight plan, and computes values based on flight profiles such as, but not limited to best time, best fuel efficiency, and clear weather selection. The FMS uses various data sources such as, but not limited to, global positioning system (GPS) receivers, inertial navigation system (INS), weather radar, traffic collision avoidance system (TCAS), automatic dependent surveillance-broadcast system (ADS-B) such as a cockpit display of traffic information (CDTI) in trail procedures (ITP) system, a radar system such as weather radar, or other flight plan relevant sources of data, to determine the position of the aircraft and calculate changes to the flight plan. For example, the FMS or other onboard avionics system can calculate changes in speed, altitude, or route to avoid collisions, find more efficient route, etc., based on external factors such as changes in weather, positions of other aircraft, etc. In some embodiments, the FMS or other onboard avionics system can propose multiple alternative changes to the flight plan. For example, based on a change in altitude, several alternative speeds or routes may be calculated based on the changed flight parameter. The data from the data sources used by the FMS can include, but is not limited to, weather (temperature, air density, wind direction, future leg storm/cloud, etc.), current position, remaining fuel, current flight weight, etc.

Hence, when a user selects an ATC clearance request page to change a given flight parameter, method 200 requests a computed value for the given flight parameter from the FMS at block 206. One example of a method of requesting the computed value for the respective flight parameter is described in more detail below with respect to FIG. 3.

At block 208, the requested computed value of the given flight parameter is displayed with the ATC clearance request page. For example, a respective field in the ATC clearance request page can be populated automatically with the corresponding computed value received from the FMS. This ATC clearance request can then be sent with automatically populated values or changed manually by the user. Alternatively, the computed value for the respective flight parameter can be displayed on the same screen, but separately from the fields used to fill in the ATC clearance request. In this way, the user can easily refer to the value displayed on the same screen and enter it manually into the corresponding field.

Hence, method 200 aids a user in requesting clearance from an ATC by requesting a computed value from the FMS and displaying the computed value in a convenient location for the user to complete the ATC clearance request. In addition, by requesting a computed value based on when a user selects to display a corresponding ATC clearance request page, method 200 provides a value that has been computed closer to the time when the ATC clearance request is to be sent. Therefore, the value used to request the ATC clearance is based on current conditions and likely to provide for an efficient route.

Figure 3:
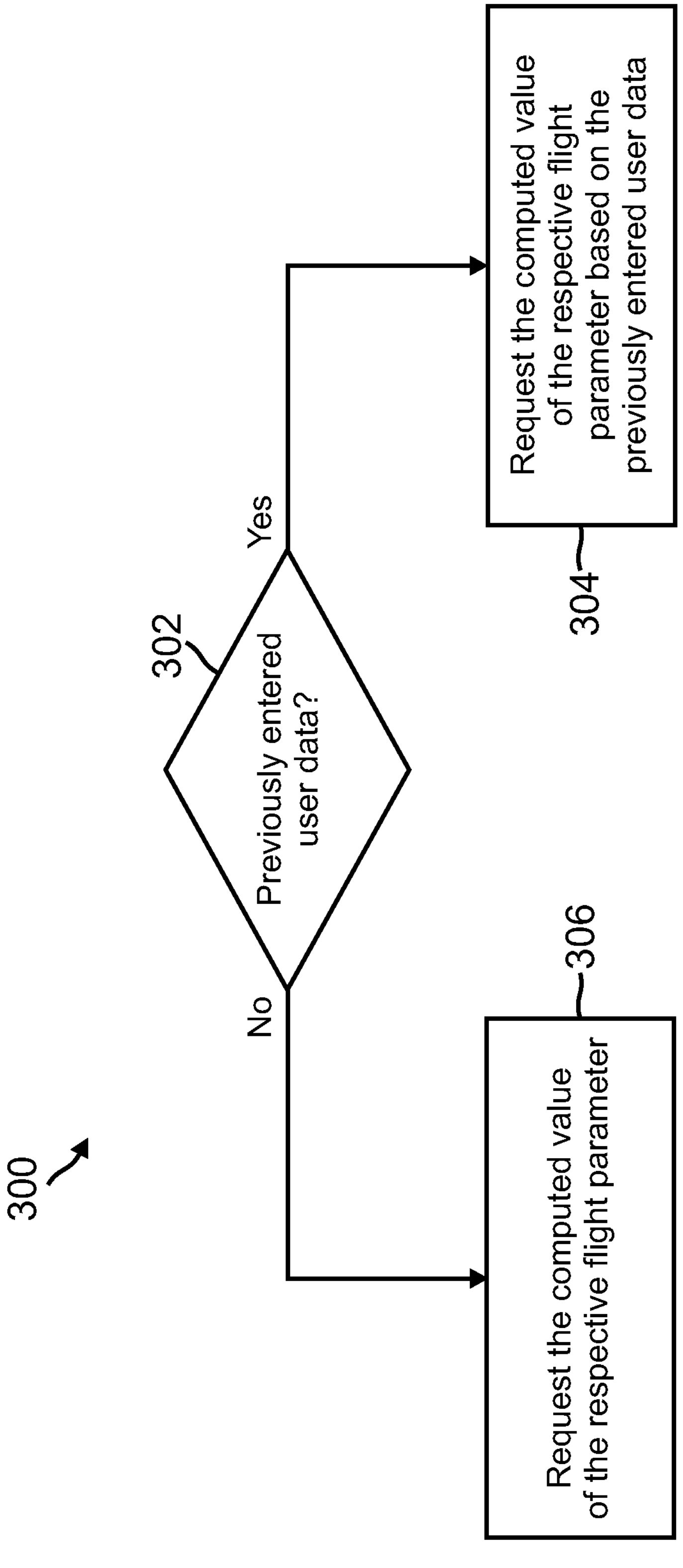
FIG. 3 is a flow chart depicting one embodiment of a method of requesting a computed value for a respective flight parameter.

FIG. 3 is an exemplary flow chart of a method 300 of requesting a computed value from the FMS for the respective flight parameter corresponding to the selected ATC clearance page at block 204 in method 200. Hence, method 300 can be used at block 206 in method 200 in some embodiments. In particular, method 300 can be used in embodiments where a user has the capability to request a change in more than one flight parameter at the same time. For example, an ATC clearance request page may contain fields for more than one flight parameter or multiple ATC clearance request pages may be filled out serially and then transmitted at the same time. More specifically, in one embodiment, a change in altitude request may need a corresponding change in airspeed. Once the altitude request is manually entered, a computed airspeed value is requested from the FMS. This allows the pilot to request ATC clearance for both the altitude change and airspeed change.

At block 302, it is determined if a user has previously entered data for one or more flight parameters related to the respective flight parameter for which a computed value is to be requested from the FMS. For example, speed, altitude, and route are related as parameters in a given flight plan. If a computed value for altitude is to be requested from the FMS, then it is determined at block 302 if a user has already entered data to request clearance for user entered values for speed and/or route.

If a user has entered values for a related flight parameter, then the previously entered user value for the related flight parameter is provided to the FMS for consideration in computing a desired value of the respective flight parameter requested from the FMS at block 304. For example, if a user entered a value for speed, the user entered value for speed is provided to the FMS for inclusion in the calculation of the value for altitude requested from the FMS. If a user has not entered values for a related flight parameter, then the desired value of the respective flight parameter is requested from the FMS at block 306 without providing any related values to the FMS for consideration in the calculation.

Figure 4:
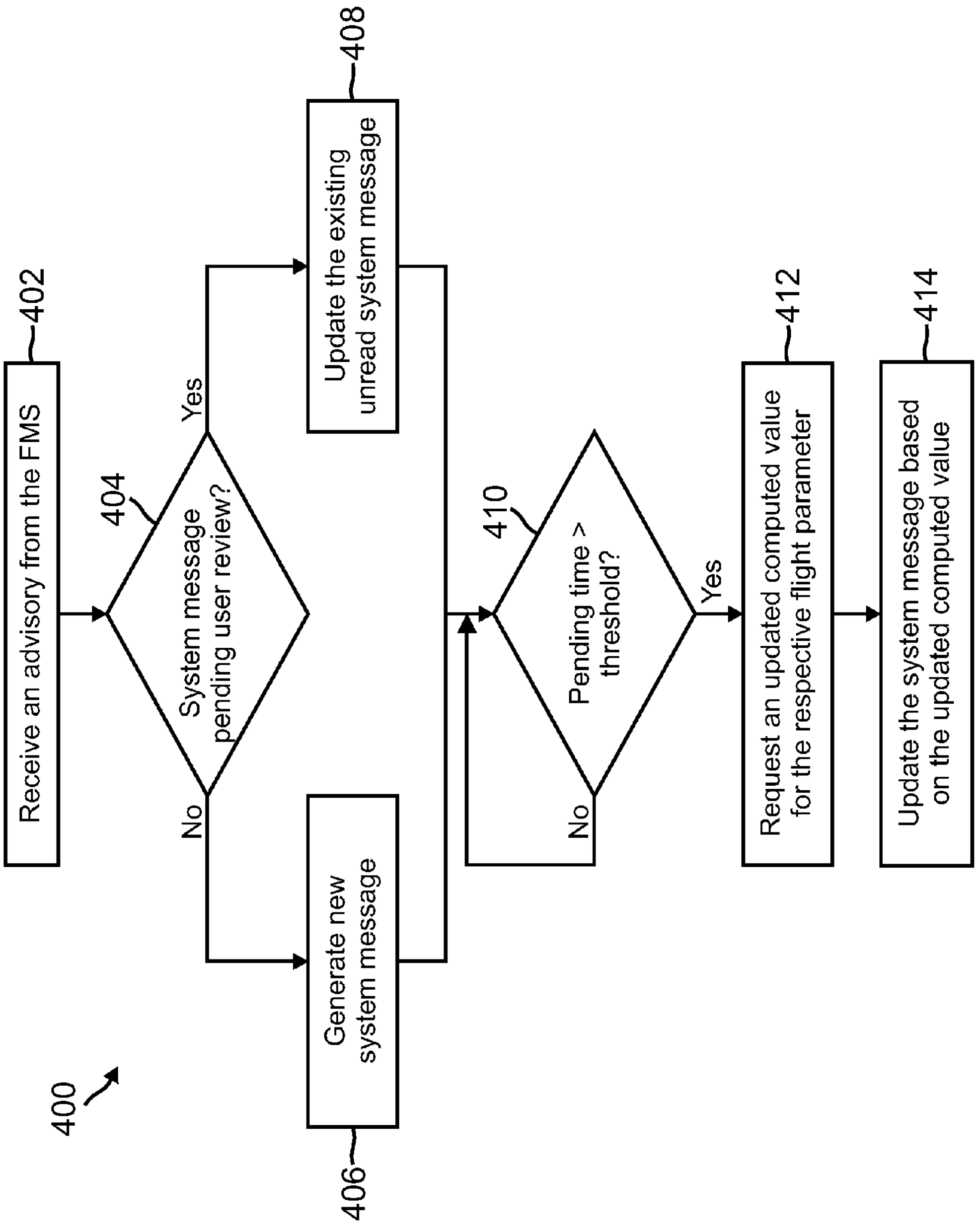
FIG. 4 is a flow chart depicting one embodiment of a method of generating a system message.

FIG. 4 is an exemplary flow chart of a method 400 of generating a system message. All or portions of method 400 can be implemented at block 202 in method 200 above. At block 402, an advisory is received from the FMS regarding a proposed change to the respective flight parameter. In particular, based on information received from one or more data sources, the FMS automatically determines if it is desirable to change one or more flight parameters. For example, the FMS may calculate a more efficient route based on weather data or advanced traffic information, etc. If the FMS determines that it is desirable to change a given flight parameter, it provides an advisory to a communication device, such as a Communication Management Unit (CMU).

When such an advisory is received, it is determined at block 404 if an existing unread system generated message includes a prompt to request a change to the same flight parameter. That is, it is determined if a system generated message is currently pending that already includes a proposed change to the same flight parameter. A pending or unread system generated message is a message that has been created, but has not been selected by a user to review or read. For example, an aircraft system typically has a list of pending messages which have not yet been read by a user.

If an existing unread system generated message includes a prompt regarding a change to the same parameter, then the existing unread system generated message is updated with the value of the respective flight parameter contained in the received advisory from the FMS at block 406.

If an existing unread system generated message does not include a request to change the same flight parameter, then a new system message is generated based on the proposed change to the flight parameter in the advisory received from the FMS. At block 310, the amount of time that the system generated message regarding a change to the respective flight parameter has been pending is compared to a threshold. The threshold is a predefined time period. If the amount of time the system generated message has been pending exceeds the threshold, then a request is sent to the FMS to request for an updated value for the respective flight parameter at block 412. At block 414, the system generated message is updated based on the updated value for the respective flight parameter. In this way, the data presented in the system generated message when read is kept up to date with the current conditions even if the message has been pending for an extended amount of time.

In addition, the system generated message can be deleted if it is determined that the change to the flight parameter is no longer needed or desired. That is, if weather conditions, traffic conditions, or the like have changed such that the current value of the flight parameter does not need to be changed. For example, at block 412, when requested to update the value of the respective flight parameter, the FMS may determine that no change is needed from the current flight parameter. When that data is returned, updating the system generated message at block 414 involves deleting the unread system generated message.

It is to be understood that portions of method 400 can be implemented independently of other portions. For example, blocks 410-414 can be implemented separately from blocks 402-408. That is, updating a pending system generated message, as described in blocks 410-414, does not necessarily depend on receiving an advisory or updating an existing system generated message as described in blocks 402-408. Similarly, receiving an advisory and updating an existing system generated message, as described in blocks 402-408, does not necessarily also include updating pending system generated messages, as described in blocks 410-414.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

What is claimed is:

1. A method for requesting air traffic control (ATC) clearance, the method comprising:

generating a system message to prompt for the user input to display the ATC clearance request page corresponding to the respective flight parameter, wherein the system message includes at least one initial computed value for the respective flight parameter;

receiving user input to display an ATC clearance request page corresponding to a respective flight parameter;

requesting at least one updated value be computed for the respective flight parameter from at least one onboard avionics system when the user input to display the ATC clearance request page is received, wherein the at least one onboard avionics system comprises flight plan relevant sources of data; and displaying the at least one updated computed value with the ATC clearance request page corresponding to the respective flight parameter.

2. The method of claim 1, wherein generating the system message further comprises: receiving an advisory from the onboard avionics system regarding a proposed change to at least one respective flight parameter; determining if an existing unread system message includes a prompt to request a change to the at least one respective flight parameter; if an existing unread system message includes a prompt to request a change to the at least one respective flight parameter, updating the existing unread system message based on the proposed change to the at least one respective flight parameter in the received advisory; and if an existing unread system message does not include a prompt to request a change to the at least one respective flight parameter, generating a new system message based on the proposed change to the at least one respective flight parameter in the received advisory.

3. The method of claim 1, further comprising: comparing the amount of time that the system message has been pending to a threshold; if the amount of time that the system message has been pending exceeds the threshold, requesting an updated computed value for the respective flight parameter; and updating the system message based on the updated computed value for the respective flight parameter.

4. The method of claim 1, further comprising: determining if the proposed change to the flight parameter in the system message is still desired; and if the proposed change is no longer desired, deleting the system message.

5. The method of claim 1, wherein requesting the at least one computed value comprises requesting the at least one computed value of the respective flight parameter based on previously entered user data corresponding to a related flight parameter.

6. The method of claim 1, wherein displaying the computed value with the ATC clearance request page comprises one of:

automatically populating a field on the ATC clearance request page with the computed value for transmission to the ATC; or displaying the computed value separate from the fields containing data to be transmitted to the ATC.

7. A program product comprising a processor-readable medium on which program instructions are embodied, wherein the program instructions are configured, when executed by at least one programmable processor, to cause the at least one programmable processor to:

generate a system message to prompt for the user input to display the ATC clearance request page corresponding to the respective flight parameter;

output a first control signal to a display unit to display the generated system message with at least one initial computed value for the respective flight parameter received from the onboard avionics system;

request at least one updated value be computed for a respective flight parameter from at least one onboard avionics system, wherein the at least one onboard avionics systems comprise flight plan relevant sources of data, when the user input to display an ATC clearance request page corresponding to the respective flight parameter is received;

receive the at least one computed value from the at least one onboard avionics system; and output a second control signal to a display unit to display the updated computed value with the ATC clearance request page corresponding to the respective flight parameter.

8. The program product of claim 7, wherein the program instructions are configured to cause the at least one programmable processor to generate a system message by causing the at least one programmable processor to: determine if an existing unread system message includes a prompt to request a change to the flight parameter after receiving an advisory from the FMS regarding a proposed change to the flight parameter; update the existing unread system message based on the proposed change to the flight parameter in the received advisory if an existing unread system message includes a prompt to request a change to the flight parameter; and generate a new system message based on the proposed change to the flight parameter in the received advisory if an existing unread system message does not include a prompt to request a change to the flight parameter.

9. The program product of claim 7, wherein the program instructions are configured to cause the at least one programmable processor to: determine if the amount of time that the system message has been pending exceeds a threshold; request at least one updated computed value from the FMS for the respective flight parameter if the amount of time that the system message has been pending exceeds the threshold; and update the system message based on the at least one updated computed value for the respective flight parameter.

10. The program product of claim 7, wherein the program instructions are further configured to cause the at least one programmable processor to: delete the system message if it is determined that the proposed change to the flight parameter in the system message is no longer desired.

11. The program product of claim 7, wherein the program instructions are further configured to cause the at least one programmable processor to:

determine if user data corresponding to a related flight parameter has been entered previously; and request the computed value of the respective flight parameter based on the previously entered user data if it is determined that the user data has been entered previously.

12. A system comprising:

one or more data sources configured to provide data relevant to a flight plan;

at least one onboard avionics system coupled to the one or more data sources, wherein the at least one onboard avionics system is configured to calculate at least one value for each of one or more flight parameters based on data received from the one or more data sources;

a display unit configured to display messages;

a user input device configured to receive input from a user;

a radio transceiver configured to transmit messages to an air traffic control (ATC) and receive messages from the ATC; and a communication device coupled to the onboard avionics system, the display unit, the user input device, and the radio transceiver;

wherein, the system is further configured to generate a system message to prompt for the user input to display the ATC clearance request page corresponding to a respective flight parameter, wherein the generated system message includes at least one initial computed value for the respective flight parameter received from the at least one onboard avionics system;

wherein, when the user input to display an ATC clearance request page corresponding to a respective flight parameter is received, the communication device is configured to request at least one updated value for the respective flight parameter be calculated by the onboard avionics system;

wherein the communication device is further configured to communicate with the display unit to display the at least one updated calculated value for the respective flight parameter with the corresponding ATC clearance request page.

13. The system of claim 12, wherein the onboard avionics system is configured to provide an advisory to the communication device when a proposed change in the respective flight parameter is calculated: wherein, in generating the system message, the communication device is further configured to: determine if an existing unread system message includes a prompt to request a change to the respective flight parameter; update the existing unread system message based on the proposed change to the respective flight parameter in the received advisory if an existing unread system message includes a prompt to request a change to the respective flight parameter; and generate a new system message based on the proposed change to the respective flight parameter in the received advisory if an existing unread system message does not include a prompt to request a change to the respective flight parameter.

14. The system of claim 12, wherein the communication device is configured to: compare the amount of time that the system message has been pending to a threshold; request at least one updated computed value from the FMS for the respective flight parameter if the amount of time that the system message has been pending exceeds the threshold; and update the system message based on the at least one updated computed value for the respective flight parameter.

15. The system of claim 12, wherein the communication device is operable to enable and disable automatically generating system messages based on one of airline modifiable information, a separate loadable database or profile, an aircraft personality module, or settings stored in non-volatile memory.

16. The system of claim 12, wherein the communication device is further configured to determine if user data corresponding to a related flight parameter has been entered previously; the communication device further configured to request the at least one proposed change in the respective flight parameter based on the previously entered user data if it is determined that the user data has been entered previously.

17. The system of claim 12, wherein the communication device is configured to communicate with the display unit to automatically populate a field on the displayed ATC clearance request page with the at least one proposed change in the respective flight parameter calculated by the onboard avionics system.

* * * * *